United States Patent [19]
Kazino et al.

[11] Patent Number: 5,294,225
[45] Date of Patent: Mar. 15, 1994

[54] SYNTHETIC RESIN GROMMET

[75] Inventors: Hiroshi Kazino; Masaaki Ide, both of Komaki; Tomiyasu Kakeno, Konan, all of Japan

[73] Assignee: K.K. Aoyama Seisakusho, Nagoya, Japan

[21] Appl. No.: 874,548

[22] Filed: Nov. 21, 1991

[51] Int. Cl.⁵ .................................. F16B 13/06
[52] U.S. Cl. .......................... 411/182; 411/508; 16/2
[58] Field of Search ............... 16/2; 411/32, 33, 55, 411/182, 44, 45, 508; 24/292, 297; 403/197, 405.1; 285/216; 174/152 G, 153 G; 248/56

[56] References Cited

U.S. PATENT DOCUMENTS

| | | | |
|---|---|---|---|
| 2,495,252 | 1/1950 | Hansen, Sr. et al. | 16/2 |
| 2,559,759 | 7/1951 | De Swart | 16/2 |
| 2,912,712 | 11/1959 | Shamban et al. | 16/2 |
| 3,109,342 | 11/1963 | Disley | 411/182 |
| 3,236,204 | 2/1966 | Joseph | 174/153 G |
| 3,243,206 | 3/1966 | Samer | 16/2 |
| 3,506,999 | 4/1970 | Neher | 16/2 |
| 3,508,292 | 4/1970 | Bond | 16/2 |
| 3,701,373 | 10/1972 | Wronke et al. | 411/182 |
| 4,179,977 | 12/1979 | van Buren, Jr. | 411/182 |
| 4,354,651 | 10/1982 | Simon | 16/2 |
| 4,359,133 | 11/1982 | Krolak | 16/2 |
| 4,656,689 | 4/1987 | Dennis | 16/2 |
| 4,971,500 | 11/1990 | Benoit et al. | 411/55 |
| 5,203,051 | 4/1993 | Tonami et al. | 16/2 |

FOREIGN PATENT DOCUMENTS

| | | | |
|---|---|---|---|
| 63059 | 5/1975 | Australia | 248/56 |
| 1490415 | 5/1969 | Fed. Rep. of Germany | 174/153 G |
| 61-46245 | 12/1986 | Japan | 16/2 |

Primary Examiner—Lowell A. Larson
Assistant Examiner—Donald M. Gurley
Attorney, Agent, or Firm—Cushman, Darby & Cushman

[57] ABSTRACT

Disclosed is a synthetic resin grommet comprising a head portion having a screw insert hole, a bottom cylindrical portion having a cylindrical hole, and a pair of locking claws. With this arrangement, the syntheric resin grommet can improves its water-proof property.

2 Claims, 2 Drawing Sheets

SYNTHETIC RESIN GROMMET

The present invention relates to a water proof synthetic resin grommet for connecting an attachment member, such as a small part, to a member to be attached by a screw.

BACKGROUND OF THE INVENTION

Conventionally, this type of synthetic resin grommet is usually composed of a grommet main-body having locking claws such as wings, ribs or the like obliquely, and upwardly formed on the side thereof (refer, for example to Japanese Utility Model Application No. Sho 60-18314).

However, the conventional grommet has some problems. That is, since the locking claws are formed along the body of the grommet itself, the body is difficult to flex because the claws are relatively rigid. Consequently the grommet cannot be easily inserted well into a member to be attached. Additionally the conventional grommet has poor water-proof sealing properties, and when the grommet is inserted into the member to be attached, a chattering is caused therebetween. The chattering results from a gap left between an upper end of the locking claws and the member to be attached. The chattering lasting generally until a tapping screw is tapped into the grommet main body to fix it in place.

SUMMARY OF THE INVENTION

A general object of the present invention is, therefore, to solve the above problems, and more specifically to provide a synthetic resin grommet which can be easily inserted into, and fixed to a member to be attached. It is another object to provide a grommet having excellent sealing properties causing no chattering, when it is inserted into the member to be attached.

According to the present invention, the above and other objects can be accomplished by a grommet which comprises a head portion having a screw insertion hole defined through the center thereof, a bottom cylindrical portion having, at the center of the head portion, a cylindrical hole, extending to the screw insert hole, and continuing to a lower surface, a pair of locking claws each having, near the head portion, a locking step formed on a base end thereof, said locking claws also having an outer extreme end, formed with an inwardly directed tapering surface, said locking claws being vertically attached to a lower surface of the head portion, with the inside thereof facing each of a pair of recessed portions each defined on an outer surface of the bottom cylindrical portion.

DESCRIPTION OF THE EMBODIMENT

Figure 1:
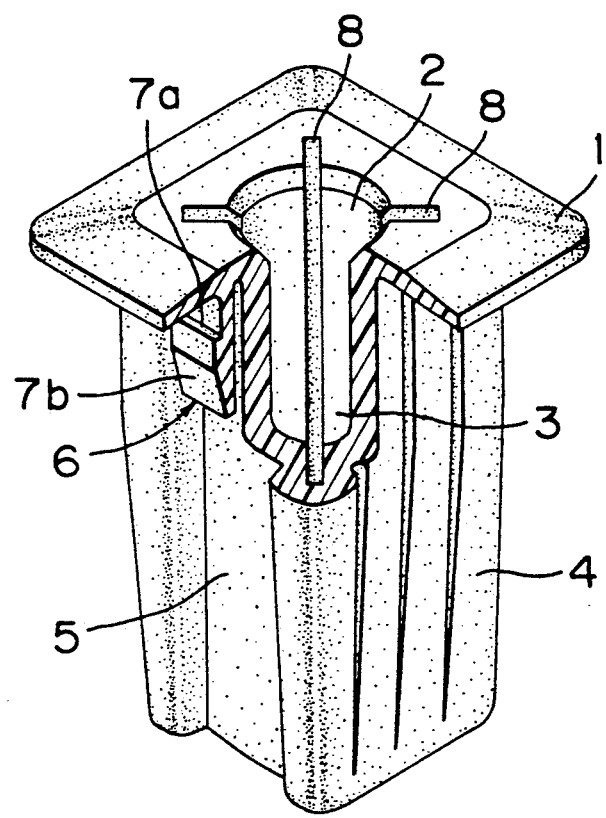
FIG. 1 is a perspective view, partially in cross section, showing an embodiment of the present invention.

Now, an embodiment of the present invention will be described in detail with reference to the drawings.

The grommet of the present embodiment comprises a square plate-shaped head portion 1, composed of a tough synthetic resin material such as a polyamide resin for example. A screw insert hole 2 is provided at the center of said head portion. A bottom portion 4 having a square exterior cross section extends from the head portion 1, and a cylindrical hole 3 extends through the bottom portion 4 to the insert hole 2. The bottom portion is integrally connected to the lower surface of the head portion 1. Recessed portions 5 are formed, on opposite positions of the outside surface of the bottomed portion 4. The recessed portions 5 extend from the lower surface of the head portion 1 to the lower end of the bottom portion 4.

A pair of locking claws 6 are connected to the head portion. Each of the locking claws having, near the head portion 1, a locking step 7a formed on an outer base end of the locking claws and inwardly directed an outer extreme end the locking claw. Each of the locking claws 6 is elastically and vertically attached to a lower surface of the head portion 1. Inside surfaces of the locking claws face towards the recessed portions 5, and the locking step 7a is positioned facing away from the bottom portion 4. Expansion-assisting vertical notches 8 are provided on the inner circumference of the screw insert hole 2. The notches pass through the head portion 1 toward each corner thereof.

Figure 2:
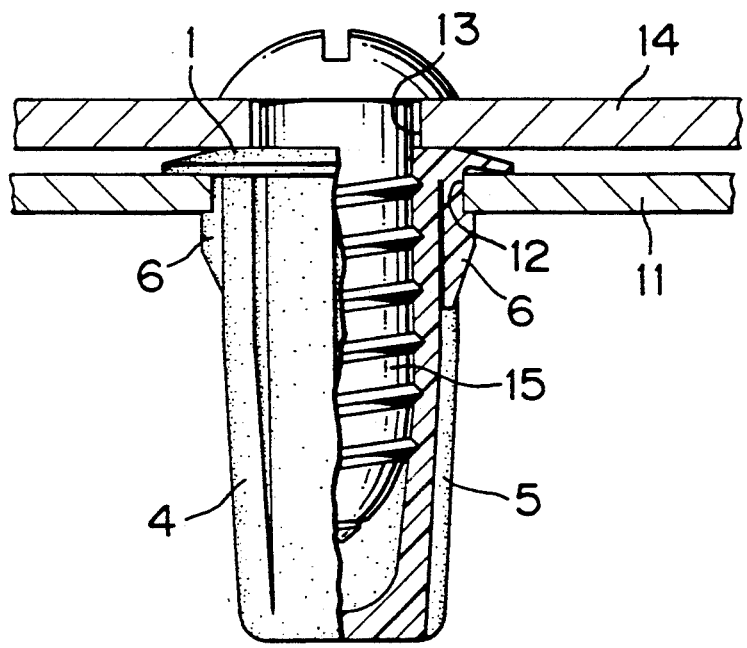
FIG. 2 is a cross sectional view of an embodiment of the present invention being used.

FIG. 2 shows an embodiment of the present invention in use. The outer extreme end of each of the locking claws 6 is vertically and elastically attached to a lower surface of the head portion 1. The surface 7b, of said locking claws 6 is formed with an inwardly directed taper. Thus, when the grommet is inserted into the substantially square-shaped engaging hole 12 provided on a member 11 to be attached, said member being composed for example of a steel plate, the inwardly tapered surface 7b is guided along the inner circumference of the engaging hole 12. As the grommet is gradually inserted, the locking claw 6 is being bent (from the base end thereof) inwardly, against the elastic force of the locking claw 6. When the locking step 7a reaches the lower end of the engaging hole 12, the locking claw reflexes and the locking claw 6 is locked (by the locking step 7a) by the effect of the elasticity thereof, so that the grommet can be accurately attached to the engaging hole 12 without causing chattering. Thus, when an attachment member 14, having an attachment hole 13 defined therethrough is placed on the surface of the head portion 1, which projects from the upper surface of the member 11 to be attached, and a tapping screw 15 is tapped into the screw insert hole 2 of the head portion 1, through the attachment hole 13, the tapping screw 15 is tapped into the cylindrical hole 3 of the bottom cylindrical portion 4, and the head portion 1 is expanded outwardly by the tapping screw 15. Accordingly, the upper portion of the bottom cylindrical portion is also expanded, so that the outer surface of each of the recessed portions 5 is abutted against the inner surface of the locking claws 6 thus causing the bottom of the locking step 7a of each of the locking claws 6 to exert pressure against the inner circumference of the engaging hole 12. As a result, the attachment member 14 can be accurately and securely attached to the member 11 to be attached.

As described above, the grommet according to the present invention provides excellent water-proof sealing properties, since the shaft of the tapping screw 15 is completely covered by the bottom cylindrical portion 4. Also the head protion 1 is firmly positioned against the inner circumference of the engaging hole 12, and the connected portions are thus completely sealed.

As is apparent from the above description, according to the present invention, the locking claws face each of the recessed portions 5 formed on outside surfaces of the bottomed cylindrical portion, and are vertically attached to a lower surface of the head portion of the grommet, thus when the grommet is inserted into a member to be attached, the locking claws are deformed inwardly by the elastic force thereof, so that the ease of insertion of the grommet is greatly improved. Further, when the synthetic resin grommet according to the present invention is inserted into the member to be attached, the locking claws are pressed against the wall of the engaging hole thereof, thus the grommet can be attached without causing chattering. In addition once a tapping screw has been tapped, the bottom portion presses the back sides of the locking claws, causing the locking claws to firmly press into the inner circumference of the engaging hole. As a result, a large fixing force, and excellent water proof sealing properties can be provided.

Consequently, the present invention solves problems of the conventional synthetic resin grommets, and thus is very valuable when practically used.

We claim:
1. A synthetic resin grommet, comprising:
   a head portion having a screw insert hole provided in a center thereof;
   a bottom portion having a square exterior cross section being connected to a lower surface of the head portion, the bottom portion having a cylindrical hole aligned with the center of said head portion, the cylindrical hole being in communication with the screw insert hole, the bottom portion having a plurality of recessed portions on an exterior surface thereof; and
   a plurality of discrete locking claws attached to the lower surface of the head portion, each said locking claw depending substantially freely from said head portion and independently of other locking claws, each locking claw comprising:
      a locking step portion formed adjacent to the head portion,
      a tapered outer surface portion at an end of the locking claw away from said head portion, and
      an inside of each locking claw facing towards and being spaced from a respective recessed portion which receives the locking claw upon being deflected toward said bottom portion.
2. A synthetic resin grommet as in claim 1, further comprising a plurality of expansion grooves on an inner surface of the bottom portion.

* * * * *